Patented May 11, 1943

2,319,057

UNITED STATES PATENT OFFICE 2,319,057

PREPARATION OF LONG CHAIN ORGANIC ISOCYANATES

William Edward Hanford, Wilmington, Del., assignor to E. I. du Pont de Nemours & Company, Wilmington, Del., a corporation of Delaware No Drawing. Application March 15, 1938, Serial No. 196,087

1 Claim. (Cl. 260—453)

This invention relates to aliphatic isocyanates and more particularly to isocyanates containing a higher aliphatic radical.

This invention has as an object the provision of a new, convenient, economical and direct method for the preparation of isocyanates from corresponding long chain amines. A further object is to prepare new di-isocyanates. Other objects will appear hereinafter.

These objects are accomplished by the following invention wherein an amine of the formula $R(NH_2)_x$, wherein R is an acylic hydrocarbon radical having a chain of at least six carbon atoms and $x$ is the valence of R, or a hydrohalide of such amine, is reacted with phosgene in the presence of a diluent which is a solvent for the reactants and chemically inert toward reactants and product, at a temperature above about 75° C. The corresponding isocyanates $R(NCO)_x$ are obtained directly in good yields.

Gattermann and Schmidt, Ann. 244, 35 (1888), reacted methylamine with phosgene but obtained methylcarbamyl chloride which required treatment with alkali for conversion to the isocyanate. Jeffreys, Am. Chem. J. 22, 27 (1899) heated pentadecylamine hydrochloride with phosgene under pressure and obtained pentadecylcarbamyl chloride. I have found that, if the reaction between phosgene and a high molecular weight aliphatic amine is conducted in the presence of a solvent of the above type, the desired isocyanate can be obtained directly and the intermediate special treatments to decompose the carbamyl chloride are avoided.

The more detailed practice of the invention is illustrated by the following examples, wherein parts given are by weight. There are of course many forms of the invention other than these specific embodiments.

Example I

*n-Dodecyl isocyanate.*—Dry hydrogen chloride was passed into a stirred solution of 460 parts of n-dodecylamine and 1700 parts of toluene until the solution was saturated. The mixture was heated to boiling and phosgene was admitted at a rate of 100 parts per hour until 250 parts had been added, and then at a rate of 30 parts per hour until a total of 390 parts had been passed in. After removal of the toluene a 95% yield of n-dodecyl isocyanate was obtained, distilling at 145° C. at 16 mm.

Example II

*n-Dodecyl isocyanate.*—Phosgene was bubbled through 250 parts of toluene at 25° C. for 20 minutes, when a solution of 56 parts of n-dodecylamine in 45 parts of toluene was added rapidly with stirring. The mixture was heated to boiling and phosgene was passed in until hydrogen chloride was no longer given off. After removing the toluene an 80% yield of n-dodecyl isocyanate was obtained by vacuum distillation of the residue.

Example III

*n-Octadecyl isocyanate.*—To a solution of 80 parts of phosgene in 450 parts of toluene was added with stirring 135 parts of n-octadecylamine in 850 parts of toluene. The mixture was heated to boiling and phosgene was passed in until hydrogen chloride was no longer given off. The toluene was removed and an 80% yield of n-octadecyl isocyanate was obtained boiling at 172–173° C. at 5 mm.

Example IV

*9-Octadecenyl isocyanate.* — Phosgene was passed into 450 parts of toluene for 15 minutes when 107 parts of 9-octadecenylamine was added with stirring. The mixture was heated to boiling and phosgene was passed through until no more hydrogen chloride was given off. After removal of the toluene, 91 parts of 9-octadecenyl isocyanate distilled at 181–183.5° C. at 4 mm.

Example V

*Cetyl and octadecyl isocyanates.*—To a stirred solution of 390 parts of phosgene in 1300 parts of toluene was added a solution of 380 parts of mixed cetyl- and octadecylamines in 2500 parts of toluene. The mixture was heated to boiling and a slow stream of phosgene was passed through until hydrogen chloride was no longer evolved. The toluene was removed and 280 parts of mixed cetyl and octadecyl isocyanates distilled at 181–193° C. at 8 mm.

Example VI

*Decamethylene diisocyanate.*—Dry hydrogen chloride was passed into a warm stirred solution of 86 parts of decamethylenediamine in 1500 parts of xylene until 36.5 parts had been taken up. The mixture was heated to boiling and phosgene was passed in until all of the material had gone into solution. The xylene was removed and from the residue was obtained 90 parts of decamethylene diisocyanate boiling at 154–157° C. at 4.5 mm.

Any solvent which dissolves the amine and its hydrohalide, does not react with the amine, isocyanate, phosgene, or hydrogen chloride, and has a boiling point above the decomposition temperature of the intermediate carbamyl chloride, i. e., above about 75° C., is operable. Suitable solvents include aromatic hydrocarbons, such as benzene, toluene, and xylene; aliphatic and alicyclic hydrocarbons, such as cyclohexane and kerosene; and halogenated hydrocarbons such as chlorobenzene, carbon tetrachloride, tetrachloroethylene, trichloroethylene, and tetrachloroethane. These and similar solvents may be substituted for the toluene of the examples.

The reaction is ordinarily carried out at atmospheric pressure but operation at lower pressures is feasible when using high boiling reactants and a high boiling solvent and facilitates removal of hydrogen chloride.

The process is generically applicable to any amine or mixture of amines of the formula $R(NH_2)_x$ where R is an acyclic hydrocarbon radical having a chain of at least six carbon atoms and having a valence of $x$ or any hydrohalide thereof. Straight or branched chain saturated or unsaturated amines may be used, and the amino group or groups can be attached to a secondary or tertiary carbon atom as well as to a primary carbon atom.

Specific amines that are suitable include the following: cetylamine, n-octylamine, 2-ethylhexylamine, n-decylamine, 2-aminotridecane, 8-aminopentadecane, 2-aminoheptane, 2-amino-5-ethylnonane, hexamethylenediamine, octamethylenediamine, undecamethylenediamine, octadecamethylenediamine, 2-methylhexamethylenediamine, 1,10-dimethyldecamethylenediamine, 2-tertbutylhexamethylenediamine, and the mixture of amines obtained by converting fatty oils to nitriles and hydrogenating these materials to amines. Oils that may be used for the production of mixed amines are coconut oil, lard oil, cottonseed oil, and sperm oil. These amines may be used as such, or may first be converted to the hydrochloride, -bromide, or -iodide.

The temperature used in the operation must be high enough to cause decomposition of the intermediate carbamyl chloride into the isocyanate and hydrogen chloride without causing the isocyanate to distill. Temperatures from 75° C. to 250° C. may be used but for convenience and economy, temperatures of 100–200° C. are preferred. Refluxing the solvent or passing an inert gas through the hot reaction mixture facilitates removal of the hydrogen chloride.

Certain of the isocyanates which may be prepared by the process of the present invention are new and particularly useful. Among these are preferred the diisocyanates $R(NCO)_2$, wherein R is a divalent acyclic hydrocarbon radical having a chain of at least six carbon atoms between the isocyanate groups.

The isocyanates prepared by the process of the present invention are of use as waterproofing agents, particularly for textiles.

The above description and examples are intended to be illustrative only. Any modification of or variation therefrom which conforms to the spirit of the invention is intended to be included within the scope of the claim.

I claim:

Decamethylene diisocyanate having a boiling point of 154°–157° C. at 4.5 mm.

WILLIAM EDWARD HANFORD.